United States Patent [19]
Meginnis

[11] 3,951,301
[45] Apr. 20, 1976

[54] SIGHT GLASS ASSEMBLY

[76] Inventor: Charles E. Meginnis, 529 1/2 Nancy St., Charleston, W. Va. 25302

[22] Filed: Nov. 8, 1974

[21] Appl. No.: 522,282

[52] U.S. Cl................................ 220/328; 220/377; 220/82 A; 350/319; 73/334
[51] Int. Cl.²........................................ B65D 25/54
[58] Field of Search ............. 73/334, 331, 330, 328; 220/82 A, 328, 377; 350/319; 116/118 R; 114/173; 52/171

[56] References Cited
UNITED STATES PATENTS

| 3,345,872 | 10/1967 | Meginnis............................. 73/334 |
| 3,625,390 | 12/1971 | Meginnis........................... 73/334 X |
| 3,746,431 | 7/1973 | Meginnis........................... 73/334 X |

FOREIGN PATENTS OR APPLICATIONS

| 141,781 | 4/1920 | United Kingdom................... 73/334 |

Primary Examiner—Richard C. Queisser
Assistant Examiner—Daniel M. Yasich

[57] ABSTRACT

A sight glass assembly comprising a housing having an opening therethrough, the opening having an enlarged section providing a shoulder, a face plate having an opening registered with the opening in the housing, mounted on the housing in opposed relation to the shoulder, a lens disposed in the enlarged section of the opening in the housing and interposed between the shoulder and the face plate, a resilient packing disposed in the enlarged section of the opening in the housing, between the lens and the housing structure, said face plate having a flange portion projecting into the enlarged section of said housing opening and engaging said resilient packing, and means for securing said face plate to said housing to apply a compressive force on the packing, causing the packing to expand laterally to provide a compressive force about the periphery of the lens.

9 Claims, 3 Drawing Figures

SIGHT GLASS ASSEMBLY

The present invention relates to a sight glass assembly, and more particularly to a sight glass assembly suitable for use with large vessels containing fluids under pressure.

In the prior art, there has been developed a type of sight glass assembly which generally includes a housing member having an opening therethrough, which is adapted to be mounted across an opening in a pressure vessel, and a lens mounted in the opening of the housing member. In the general type of sight glass assembly, it has been found that the principal sources of failure have consisted of fractures of the lens resulting in blow-outs, and leakage of the medium in the pressure vessel through the assembly between the housing member and the lens. Such causes of sight glass failures have greatly been obviated in prior art sight glass designs wherein a packing is provided between the wall of the housing opening and the periphery of the lens which packing is placed under compression causing it to expand laterally and correspondingly place the lens in radial compression and form a fluid tight seal between the lens and the housing structure. It has been found to be desirable, however, to provide such an assembly which can be more economical to manufacture and is more effective in performance.

Accordingly, it is the principal object of the present invention to provide an improved sight glass assembly.

Another object of the present invention is to provide an improved sight glass assembly for use on vessels containing fuids under pressure.

A further object of the present invention is to provide an improved sight glass assembly of the type utilizing a packing member disposed between a lens and the housing in which the lens is mounted, which cooperates with other components of the assembly to place the lens under radial compression thus preventing a blow-out of the lens upon the lens becoming fractured, and to form a fluid tight seal between the lens and the housing structure thereof.

A still further object of the present invention is to provide an improved sight glass assembly utilizing a resilient packing member interposed between the lens and housing thereof, in which the resilient packing member is shielded from the possible corrosive effects of the medium contained in the vessel on which the assembly is mounted.

Another object of the present invention is to provide an improved sight glass assembly of the type utilizing a resilient packing member interposed between a lens and a housing member in which the lens is mounted, which cooperates with other components of the assembly to place the lens in radial compression and to form a fluid tight seal between the lens and the housing, which can be more economical to manufacture and is more effective in performance and reliability.

Other objects and advantages of the present invention will become more apparent to those persons having ordinary skill in the art to which the present invention pertains, from the following description taken in conjunction with the accompanying drawing, wherein.

Figure 1:
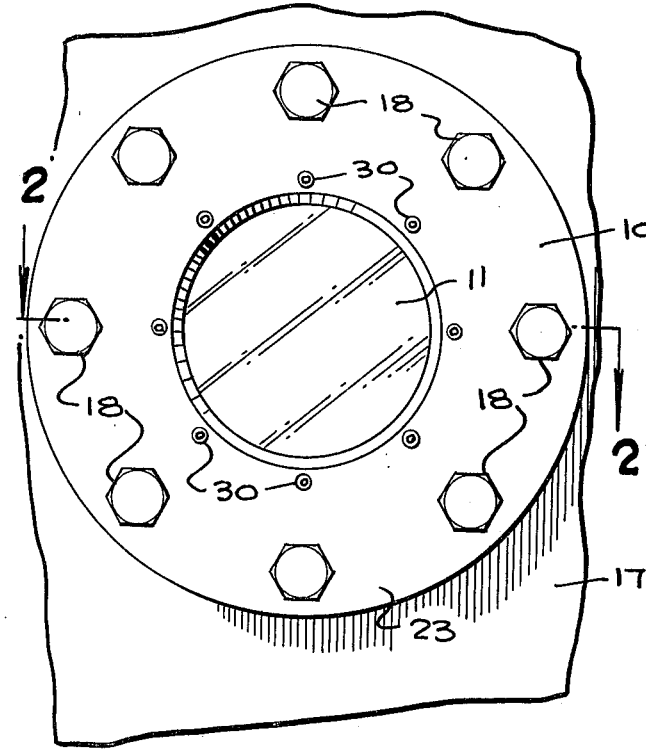
FIG. 1 is a top plan view of an embodiment of the invention.
Figure 3:
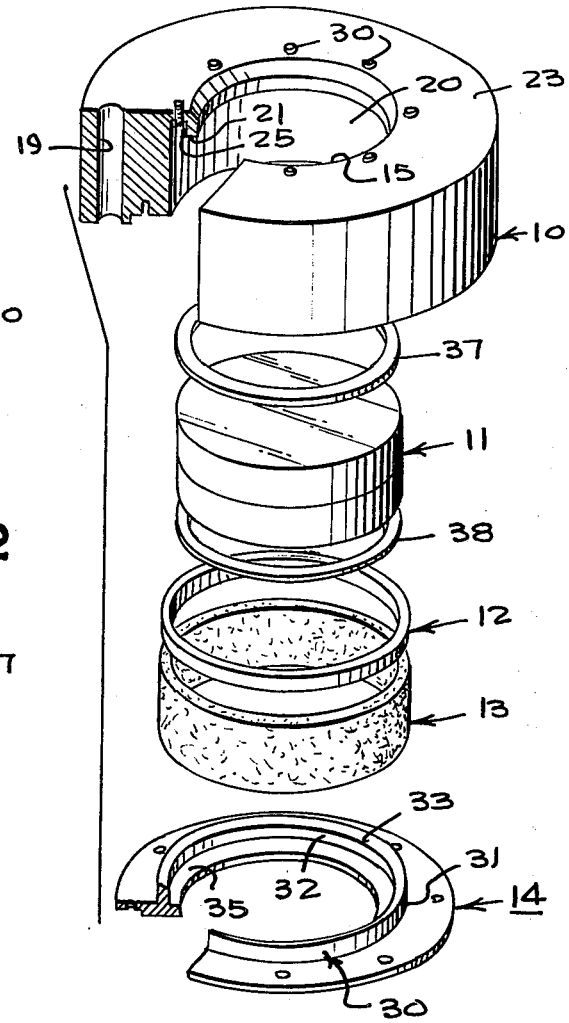
FIG. 3 is an exploded view of the embodiment illustrated in FIGS. 1 and 2.
Figure 2:
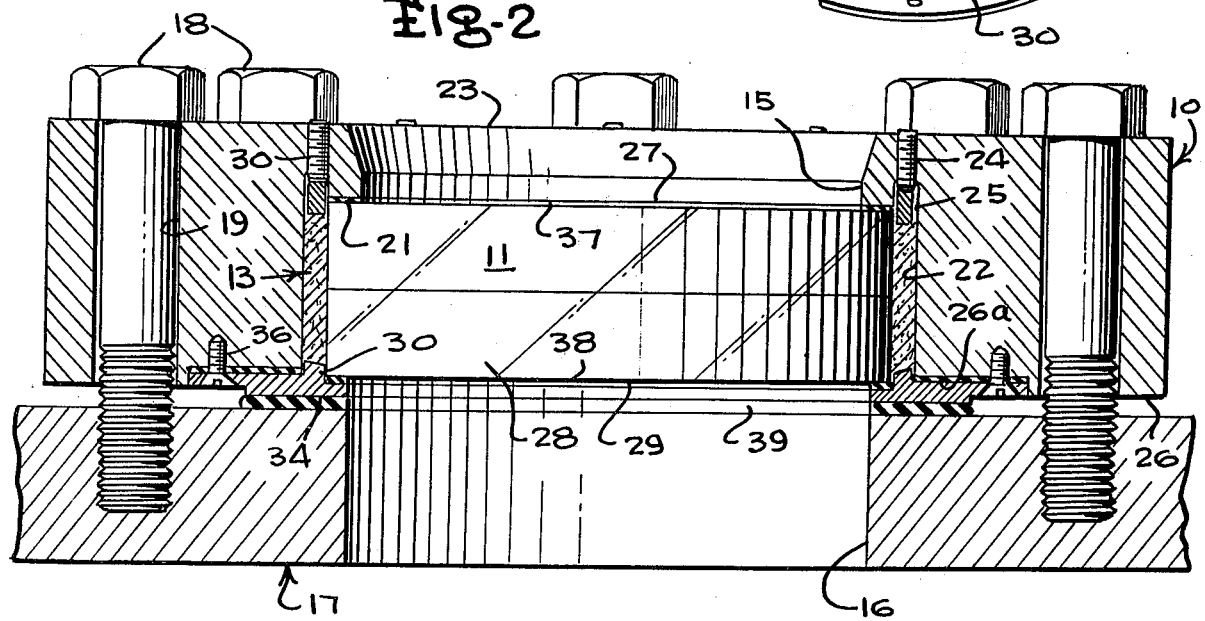
FIG. 2 is an enlarge cross-sectional view taken along line 2—2 in FIG. 1.

The embodiment illustrated in FIGS. 1 through 3 generally includes a housing member 10, a lens 11, a compression ring 12, a resilient packing 13 and a face plate 14. Housing 10 generally has an annular configuration, providing an opening 15 adapted to register with an opening 16 in a wall 17 of a fluid container. The housing member is secured to the fluid container by means of plurality of bolts 18 extending through suitable openings 19 circumferentially spaced in the housing member, which are adapted to register with suitable threaded holes in the wall of the fluid container. The opening 15 in the housing member is provided with an enlarged section 20 which provides an annular shoulder 21 and an annular wall 22. Outer end surface 23 of the housing member is provided with a plurality of circumferentially spaced threaded holes 24 which communicate at their inner ends with an annular recess 25 formed in annular shoulder 21. Inner end surface 26 is provided with an annular recess 26a for accommodating face plate 14, as later will be described.

Lens 11 is mounted in enlarged section 20 of opening 15 and is provided with an outer surface 27 seated about its periphery on annular shoulder 21, a circular side surface 28 spaced from annular wall 22 of the housing member to provide an annular space between the lens and the housing member, and an inner surface 29 exposed to the interior of the fluid container through opening 16. Resilient packing 13 is disposed in the annular space provided between the lens and the housing member and extends substantially the entire length of the space. Compression ring 12 is seated on the outer end of packing 13 and is received at its outer end in recess 25 formed in annular surface 21. The outer end of compression ring 12 also is engaged by a plurality of set screws 30 which are threaded in holes 24.

Face plate 14 is mounted in recess 26a of the housing member and includes an annular flange portion 30 which projects into the annular space provided between the lens and the housing member. Flange portion 30 has radially spaced, annular side surfaces 31 and 32 which engage wall 22 of the enlarged section of the housing opening and circular wall 28 of the lens, respectively, and an inclined surface 33 which engages an end of packing 13. Flange portion 30 also is spaced laterally from the radially inner side of the face plate to provide a lip portion 34 having an annular gasket seating surface 35 on which the inner peripheral portion of the lens is supported. The face plate further is provided with a plurality of circumferentially spaced openings registerable with threaded openings in the housing member for receiving a plurality of screws 36. As best illustrated in FIG. 2, the outer and inner peripheries of the lens are protected by an outer gasket 37 interposed between the peripheral portion of outer surface 27 of the lens and annular shoulder 21 of the housing, and a gasket 38 interposed between the peripheral portion of surface 29 of the lens and annular surface 35 of face plate 14.

In the assembly of the embodiment described, the housing is first positioned on its outer surface 23 and the compression ring is positioned within enlarged section 20 of opening 15 so that it rests within annular recess 25 on the ends of set screws 24. Next, gasket 37 is placed in opening 15 and positioned on annular shoulder 21. The lens is then inserted into the opening so that it is centered in the opening and the peripheral portion of surface 27 thereof is seated on gasket 37. Packing 13 then is inserted in the annular space between the lens and the housing, and forced into engagement with the compression ring. Gasket 38 is next positioned on the perhiperal portion of lens surface 29, and the face plate is placed in recess 26 so that the annular flange portion 30 projects into the annular space between annular wall 22 and the circular surface 28 of the lens, with inclined surface 33 engaging packing member 31 and annular surface 35 engaging gasket 38. Under such conditions, due to the uncompressed state of the packing member, the face plate will be spaced from the housing. Screws 36 are then inserted in the aligned openings in the face plate and housing, and tightened to force the annular flange portion 30 of the face plate into the space between the housing and the lens to compress the packing member against the compression ring. Such action will cause the packing to expand laterally thus placing the lens under radial compression and simultaneously forming a seal between the housing and the periphery of the lens. If necessary, set screws 30 then may be tightened to force the packing member against the inclined surface 33 of the face plate thus further causing the packing member to expand laterally increasing the radial compression force applied to the periphery of the lens and further enhancing the seal between the housing member and the periphery of the lens. In this regard, it will be noted that as set screws 30 are tightened, forcing compression ring 12 downwardly, the longitudinal force applied to inclined surface 33 of the face plate will be resolved into a reactant forces including a radially inwardly directed resultant force applied to the periphery of the lens. Alternatively, the face plate may be forced into contact with the housing with the use of a press and held in such position while set screws are threaded into the openings.

With the unit thus assemblied the assembly is mounted on the container wall so that lens 11 closes wall opening 16, face plate 14 engages a gasket 39 disposed on the container wall about the periphery of opening 16, and bolt holes 19 are aligned with the threaded holes in the container wall. Bolts 18 are then inserted through bolt holes 19 and threaded into the threaded holes in the container wall and tightened to complete the mounting of the assembly.

After the assembly has thus been mounted on the container wall and at subsequent times as may be required, set screws 30 may be tightened to further compress the packing member and thus assure that the lens is maintained in radial compression and that the seal between the housing and the periphery of the lens is intact.

The unit may be disassembled essentially by reversing the procudure as described. Whenever the lens, packing member or gaskets 37 and 38 require replacement, bolts 18 are removed to dismount the unit, screws 36 are removed and the lens, packing member and gaskets are free to be removed. The replacement components can then be installed in the housing member and secured therein in the manner as previously described, and the unit again can be remounted on the container wall with a minimum of delay.

Since the housing member would be shielded from the corrosive effects of the fluid within the container, it may be fabricated from any suitable material having sufficient strength characteristics, such as carbon steel. Face plate 17 being constantly exposed to the interior of the fluid vessel should be fabricated of a material impervious to the effects of the fluid contained in the vessel. Preferably, the face plate is fabricated of stainless steel or a similar suitable metal. The packing member preferably should be fabricated of a packing material impervious to the effects of the fluid within the vessel. In this regard, however, it particularly is to be noted that the lip portion of the face plate and also the projection of annular flange 30 into the annular space between the lens and the lens housing function to inhibit the flow of fluid within the vessel into contact with the packing member.

To shield the packing member further from the effects of the fluid in the container, it is contemplated that a protective liner formed of a suitable impervious material, such as TEFLON, be used. Such a liner would include a cylindrical portion interposed between the packing member and the lens, and an annular flange portion interposed between the packing member and the face plate.

As an alternative construction of the compression ring, the packing engaging surface thereof may be inclined to provide a resultant component of force applied to the periphery of the lens as either the compression ring or face plate are urged toward each other.

From the foregoing detailed description, it will be evident that there are a number of changes, adaptations and modifications of the present invention which come within the province of those persons skilled in the art. However, it is intended that all such variations not departing from the spirit of the invention be considered as within the scope thereof as limited solely by the appended claims.

I claim:

1. A sight glass assembly comprising a housing structure having an opening therethrough, said opening having an enlarged section providing a shoulder, a face plate having an opening registered with the opening in said housing structure and mounted on said housing structure in opposed relation to said shoulder, a lens disposed in the enlarged section of the opening in said housing structure and interposed between said shoulder and said face plate, a packing member disposed in the enlarged section of said opening between said housing structure and the periphery of said lens, said face plate having a flange portion of a preselected configuration and projecting longitudinal into said enlarged section and engaging said packing member, means for securing said face plate to said housing structure, applying a force on said packing member whereby said packing member is caused to expand laterally to provide a compressive force about the periphery of said lens and effect a seal between said housing structure and the periphery of said lens, a compression ring disposed in said enlarged section of said opening engaging said packing member at an end opposite the end of said packing member engaged by the flange portion of said longitudinal plate, and screws threaded into openings provided in said housing structure engaging said compression ring whereby upon threading said screws into said openings, said ring will exert an additional longitudinal force on said packing member directed toward the flange portion of said face plate, resulting in a radially inward force causing said packing member to expand laterally.

2. A sight glass assembly according to claim 1 wherein the flange of said face plate is provided with a surface inclined relative to a longitudinal center line opposite opening.

3. A sight glass assembly according to claim 1 including a first gasket interposed between said lens and said housing structure and a second gasket interposed between said lens and said face plate.

4. A sight glass assembly according to claim 1 including means for securing said housing structure to a wall with said lens overlying an opening therein.

5. A sight glass assembly according to claim 1 wherein said face plate is received within a peripheral recess in said housing structure.

6. A sight glass assembly according to claim 1 wherein said enlarged section of said opening provides a peripheral shoulder, said shoulder is provided with a peripheral recess, and a portion of said compression ring is disposed in said recess.

7. A sight glass assembly according to claim 1 wherein the longitudinally outer end of the flange portion of said face plate is provided with a surface inclined relative to a longitudinal center line of said opening, including a first gasket interposed between said lens and said housing structure and a second gasket interposed between said lens and said face plate, including means for securing said housing to a wall with said lens overlying an opening therein, and wherein said face plate is received within a peripheral recess in said housing structure.

8. A sight glass assembly according to claim 7 wherein the enlarged section of said housing opening provides a peripheral shoulder, said shoulder is provided with a peripheral recess and a portion of said compression ring is disposed within said recess.

9. A sight glass assembly according to claim 1 wherein the surface of said compression ring engaging said packing member, is inclined relative to a longitudinal center line of said housing opening.

* * * * *